US 6,704,100 B2

(12) United States Patent
Sengupta et al.

(10) Patent No.: US 6,704,100 B2
(45) Date of Patent: Mar. 9, 2004

(54) SYSTEMS AND METHODS FOR ACCURATELY MEASURING LOW VALUES OF POLARIZATION MODE DISPERSION IN AN OPTICAL FIBER USING LOCALIZED EXTERNAL PERTURBATION INDUCED LOW MODE COUPLING

(75) Inventors: Abhijit Sengupta, Alpharetta, GA (US); Alan H. McCurdy, Duluth, GA (US)

(73) Assignee: Fitel USA Corp., Norcross, GA (US)

(*) Notice: Subject to any disclaimer, the term of this patent is extended or adjusted under 35 U.S.C. 154(b) by 10 days.

(21) Appl. No.: 10/215,565

(22) Filed: Aug. 8, 2002

(65) Prior Publication Data

US 2004/0027559 A1 Feb. 12, 2004

(51) Int. Cl.[7] .............................................. G01N 21/00
(52) U.S. Cl. ..................................................... 356/73.1
(58) Field of Search ...................... 356/73.1; 385/11–14

(56) References Cited

U.S. PATENT DOCUMENTS

| | | | |
|---|---|---|---|
| 5,298,047 A | | 3/1994 | Hart, Jr. et al. |
| 5,943,466 A | | 8/1999 | Henderson et al. |
| 6,020,584 A | * | 2/2000 | Brarens et al. ........ 250/227.17 |
| 6,556,732 B1 | * | 4/2003 | Chowdhury et al. .......... 385/11 |
| 6,587,622 B2 | * | 7/2003 | Maroney et al. ............... 385/41 |
| 6,591,024 B2 | * | 7/2003 | Westbrook .................... 385/11 |
| 2002/0191883 A1 | * | 12/2002 | Wood et al. .................... 385/11 |

OTHER PUBLICATIONS

N. Gisin, B. Gisin, J.P. Von Der Weid, and R. Passy, *How Accurately Can One Measure A Statistical Quantity Like Polarization–Mode Dispersion?*, IEEE Photonics Technology Letters, vol. 8, No. 12, Dec. 1996.

* cited by examiner

*Primary Examiner*—Tu T. Nguyen
(74) *Attorney, Agent, or Firm*—Alston & Bird LLP

(57) ABSTRACT

Systems and methods are disclosed for measuring Polarization Mode Dispersion (PMD) of single-mode optical fiber. The method allows for a faster and easier method of accurately measuring intrinsic ultra low PMD optical fiber in a low mode coupling state. The method involves the introduction of a plurality of localized external perturbations on the optical fiber, after which the optical fiber is allowed to reach a steady state, and then measurement of the differential group delay occurs using standard measurement techniques. The plurality of localized external perturbations is altered followed by another measurement of the differential group delay. After obtaining a sufficient number of measurements to provide a Maxwellian distribution, the Polarization Mode Dispersion value can be calculated as the average of the distribution.

18 Claims, 8 Drawing Sheets

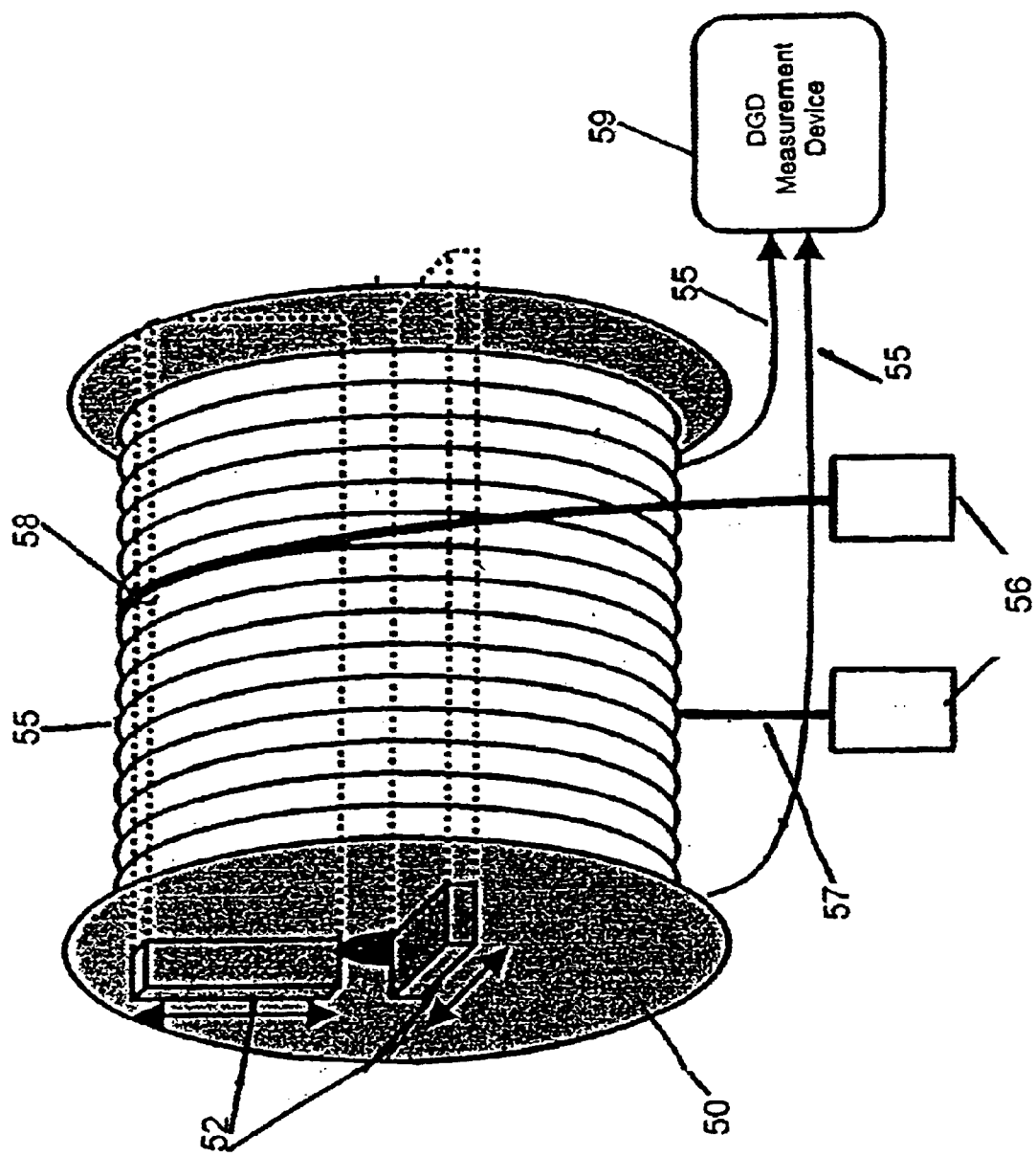
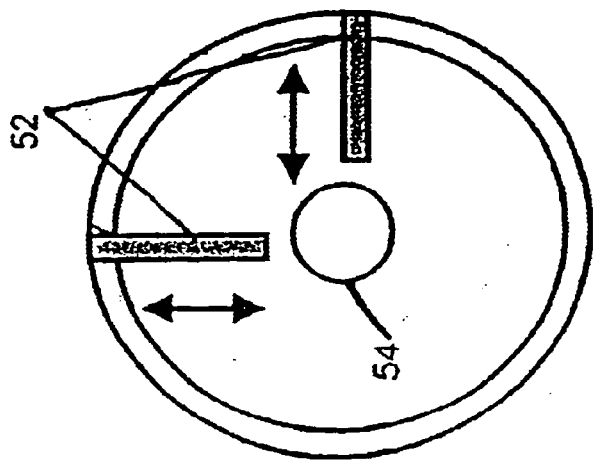
Figure 5B
Figure 5A

SYSTEMS AND METHODS FOR ACCURATELY MEASURING LOW VALUES OF POLARIZATION MODE DISPERSION IN AN OPTICAL FIBER USING LOCALIZED EXTERNAL PERTURBATION INDUCED LOW MODE COUPLING

BACKGROUND OF THE INVENTION

This invention relates to systems and methods of accurately measuring low values of Polarization Mode Dispersion (PMD) in an optical fiber. Specifically, the method provides accurate optical fiber measurement of PMD in a low mode coupling condition.

It is well known that the so-called "single mode fiber" that is commonly used in communication systems is not purely single mode. Rather, two modes, with perpendicular polarizations, exist in a single mode fiber. See, for example, Dandliker, R., Anisotropic and Nonlinear Optical Waveguides, C. G. Someda and G. Stegeman (editors), Elsevier, N.Y., 39–76, 1992. Mathematically, these two polarizations form an orthogonal basis set. Accordingly, any configuration of light that propagates through a single mode fiber can be represented by a linear superposition of these two modes.

If the fiber is perfectly circularly symmetric in both geometry, and internal and applied stress, the two polarization modes are degenerate. They propagate with the same group velocity and have no time delay difference after traveling the same distance in the fiber. However, in practice, an optical fiber is not perfectly circularly symmetric. Imperfections such as geometric and form deformation and stress asymmetry break the degeneracy of the two modes. See, for example, Rashleigh, S. C., Journal of Lightwave Technology, LT-1:312–331, 1983. As a result, the two polarization modes propagate with different propagation constants $\beta_1$ and $\beta_2$. The difference between the propagation constants is termed birefringence ($\Delta\beta$) and the magnitude of the birefringence is defined y the difference in the propagation constants of the two orthogonal modes:

$$\Delta\beta=\beta_1-\beta_2$$

Birefringence causes the polarization state of light propagating in the fiber to evolve periodically along the length of the fiber. The distance required for the polarization to return to its original state is the fiber beat length ($L_b$), which is inversely proportional to the fiber birefringence. In particular, the beat length $L_b$ is given by:

$$L_b=2\pi/\Delta\beta$$

Accordingly, fibers with greater birefringence have shorter beat lengths and vice versa. Typical beat lengths observed in practice range from as short as 2–3 millimeters (a high birefringence fiber) to as long as 10–50 meters (a low birefringence fiber).

In addition to causing periodic changes in the polarization state of light traveling in a fiber, the presence of birefringence means that the two-polarization modes travel at different group velocities, the difference group delay (DGD) increasing as the birefiingence increases. Randomness of the birefringence creates a statistical distribution of the DGDs. The statistical average of the DGDs between the two polarization modes is called polarization mode dispersion, or PMD. PMD causes signal distortion that is detrimental for accurate signal transmission for both high bit rate digital systems and analog communication systems. Various mechanisms have been identified for reducing PMD in optical cable during manufacturing, such as spinning the optical fiber during manufacturing. See, for example, Systems and Methods for Forming Ultra-Low PMD Optical Fibers Using Amplitude and Frequency Keyed Fiber Spin Functions, application Ser. No. 10/202,540, filed on Jul. 23, 2002 by the same assignee which is incorporated by reference into this application. It is therefore desirable to measure the PMD levels of an optical fiber cable.

The intrinsic birefringent characteristic of a fiber can be impacted by a variety of factors, including not only the above mentioned spin during draw, but fiber core ovality, non-axisymmetric mechanical stress caused by factors internal to the fiber, and extrinsic effects (bending, twist, tension force, temperature variation etc.). (See S. C. Rashleigh, "Origins and Control of Polarisation Effects in Single-Mode Fibers," J. Lightwave Tech., LT-1, No. 2, (1983) p. 312–331.) Though both intrinsic and extrinsic effects play a role in any practical fiber deployment, it is desirable to measure the intrinsic PMD of an optical fiber. This allows a manufacturer to publish a fiber's PMD specification independent of any particular cable geometry and provides a metric by which process improvement may be measured in manufacturing the optical fiber.

It has long been known that PMD measurements of useful fiber lengths on shipping spools (which are typically 160 mm in diameter) do not reflect the intrinsic fiber PMD. These measurements are strongly-influenced by external effects on the fiber, such as tension, (from a normal force of 30–40 grams from spooling) and mode coupling that occurs because of fiber crossovers, the mode coupling is influenced by twist on the cable associated with spooling of the fiber. When the fiber is unspooled, these external effects are altered and an ideal relaxed fiber would be in a "low mode coupled" (LMC) condition. The best estimate of "intrinsic" PMD can be obtained by measurements under LMC condition. Hence, various so-called LMC techniques have been developed to measure PMD in alternative configurations. Three configurations have largely been developed for measuring PMD: "quiescent" cable, large diameter spool, and loose fiber. However, as it will be seen, each configuration presents some limitations.

The "quiescent" cable configuration measures optical fiber that has been incorporated into a cable, which comprises one or more optical fibers and various layers of sheathing. Cables are not generally considered to be valid LMC configurations because of the invariable external mechanical stresses imposed by the sheathing and application of colors during manufacturing. However, 'loose tube' cable configurations, while not entirely eliminating fiber twists and crossovers, do provide a lower mode-coupling environment for the fiber. Thus, fiber in cables of this sort, such as those used in undersea cables, should perform in a similar way as compared to the same fiber under true LMC conditions. But, many other cable configurations do not perform in a similar way as the same fiber under true LMC conditions. Further, the physical facilities for measuring long distances of cables may require large (30 ft diameter) pans for winding the cable in a LMC condition, and a conventional fiber manufacturer may not have these types of facilities.

The second configuration incorporates the use of large diameter spools (generally 300 mm or larger) on which the fiber is wound at low tension for providing a conventional LMC reading. However, bending birefringence is not entirely eliminated and zero tension on the fiber is impossible to obtain using a conventional rewinder apparatus. Further, the distance of fiber that can be measured is limited since only a single layer of fiber can be wrapped on the spool. Of course, larger and larger diameter spools can be used, but larger sizes complicate handling the spools and increases space requirements. Thus, depending on the spool surface area and size, the length of fiber that may be measured can be severely limited.

The third configuration for measuring fiber in a LMC condition is to measure the fiber in an unrestrained configuration by using loose coils or collapsible spools. This technique arranges the loose fiber on a large, flat surface where the fiber is spread out to allow zero tension and large bend radii. It is necessary that the fiber be in a 'relaxed' state to eliminate bending and tensioning stress as much as possible of the optical fiber. Frequently, a period of time is required for the fiber to 'relax' in order to obtain accurate measurements. However, the physical arrangement of fiber in a 'loose' configuration is a potentially awkward arrangement and the length of fiber that can be measured is based on the size of the facility. In all three techniques, measuring short lengths fiber of a few kilometers is possible, but measuring larger lengths becomes increasingly logistically difficult.

Further complicating the measurement of PMD is that current optical fibers typically represents much lower PMD values than fibers manufactured a few years ago. Whereas fiber in the mid 1990's exhibited PMD values typically greater than 0.5 ps/km$^{1/2}$, today's fiber typically exhibits values in the 0.01–0.04 ps/km$^{1/2}$ range. Consequently, many of the conventional measuring techniques and practices cannot accurately measure such low PMD values.

Standards bodies comprising industry experts, which proscribe uniform methods for measuring PMD, have advocated both use of the large diameter spool and the loose coil method where the fiber is placed in a racetrack configuration. These recommendations have largely ignored the practical aspects of handling fiber in such an arrangement and/or have relied upon current commercial test equipment that requires a high minimum measurable PMD.

Consequently, there is a need to easily measure PMD in optical fiber in a rapid and logistically simplified manner yielding accurate measurement results without being constrained to relatively short lengths of optical fibers.

SUMMARY OF THE INVENTION

A method is disclosed for measuring the polarization mode dispersion of an optical fiber using the steps of introducing a plurality of localized external perturbations (LEP), measuring the differential group delay, altering the LEP, measuring the differential group delay, and repeating the steps sufficiently to produce a polarization mode dispersion value.

Further, an example system is disclosed for measuring the polarization mode dispersion of an optical fiber comprising of a device for introducing LEP onto a fiber, a device for measuring the differential group delay, and a processor receiving the measurement and processor calculating a polarization mode dispersion value.

BRIEF DESCRIPTION OF THE DRAWINGS

FIGS. 5A and 5B illustrate one embodiment of a method of measuring fiber with an introduced localized external perturbation in a low mode coupling state according to the principles of the present invention.

DETAILED DESCRIPTION OF THE INVENTION

The presence of birefringence in optical fibers means that the two polarization modes travel at different group velocities, with the difference of velocities increasing as the birefringence increases. The differential time delay between the two polarization modes is called polarization mode dispersion, or PMD.

The PMD value can be expressed as the average measurements of differential group delay (DGD) over all wavelengths. The DGD reflects the time delay between light launched in the two principle states of the fiber at a given wavelength and is expressed in units of time. Presently manufactured optical fiber with a low PMD of a length of a few kilometers, the DGD delay values range between 10 and 50 femto-seconds (fs). Since a DGD measurement is measured in time and varies with the length of the fiber, a DGD coefficient is defined that provides a DGD value independent of the measured fiber length. In the "randomly varying" "long length" regime, the DGD coefficient is the DGD value (time) divided by the square root of the length of the fiber. Typical average of DGD values (i.e., the PMD) range in the 0.01–0.04 ps/km$^{1/2}$ range.

Most of the commercial PMD measurement/test equipment requires a rather high minimum value to provide the desired degree of accuracy that necessitates the corresponding long length of fiber. The only conventional measurement technique with accuracy in the femto-second range is the Jones Matrix Eigenanalysis (JME) or one of its variants. This technique is well known to those skilled in the field, but even this technique has limitations of measuring PMD on lengths of fiber with a minimum length in a LMC configuration.

In measuring PMD, care must be taken in regard to the fiber relaxation effects, which can dramatically effect PMD measurements. Ensuring the fiber is relaxed is important for avoiding bending and tensioning stress associated with spooling as well as any other stress imposed by external forces on the fiber when it is manually disturbed. The goal is to measure the fiber in the fully relaxed state.

Figure 1A:
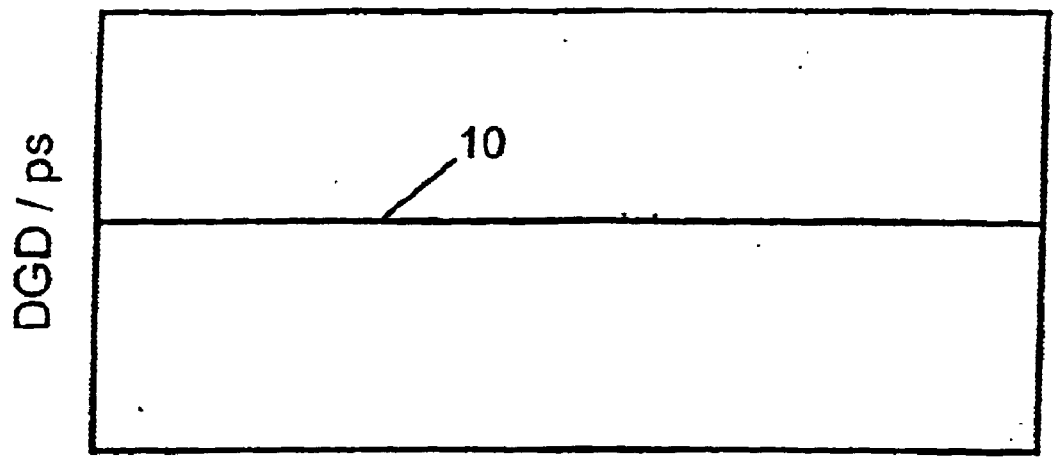
FIG. 1A illustrates a uniform differential group delay with respect to wavelength.
Figure 1B:
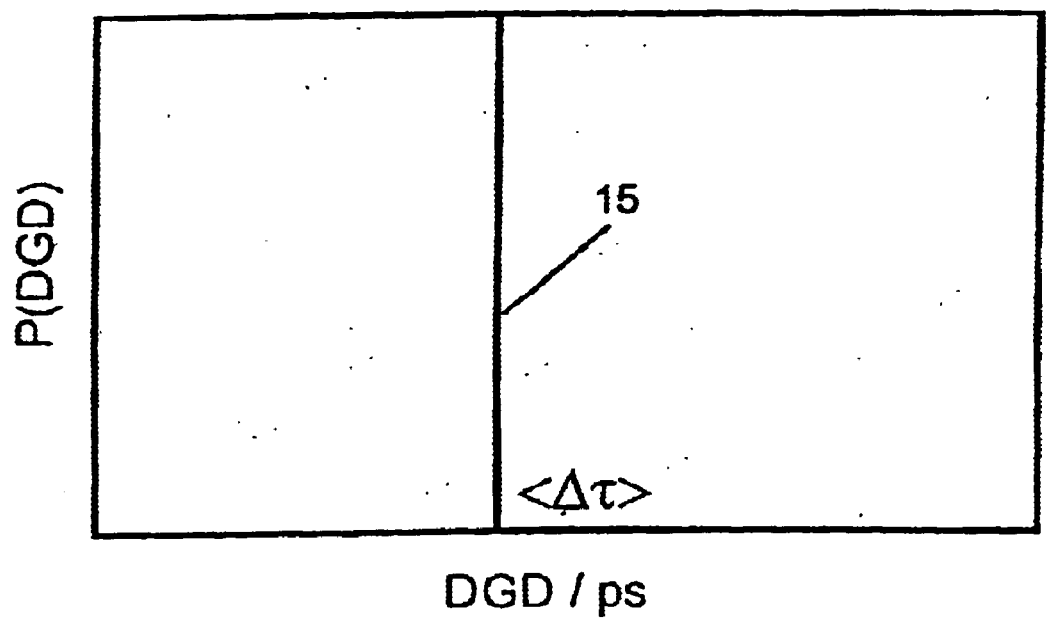
FIG. 1B illustrates a probability distribution function of the differential group delay of FIG. 1A.

The JME family of techniques is used to measure the DGD at various wavelengths and the averaging of the measurements to obtain the PMD coefficient. As illustrated in FIG. 1A, in a uniformly birefringent fiber, there is no wavelength dependence to the DGD. Specifically, the DGD measurement 10 does not vary with respect to the wavelength and an idealized JME measurement will then find the same DGD value for all wavelengths. The resulting probability density is a delta function with the PMD, which is the wavelength average of the DGD, equal to the DGD. FIG. 1B shows this deterministic case with the distribution 15 being non-zero only for value At. A very narrow band instrument could correctly measure this PMD value.

Figure 2A:
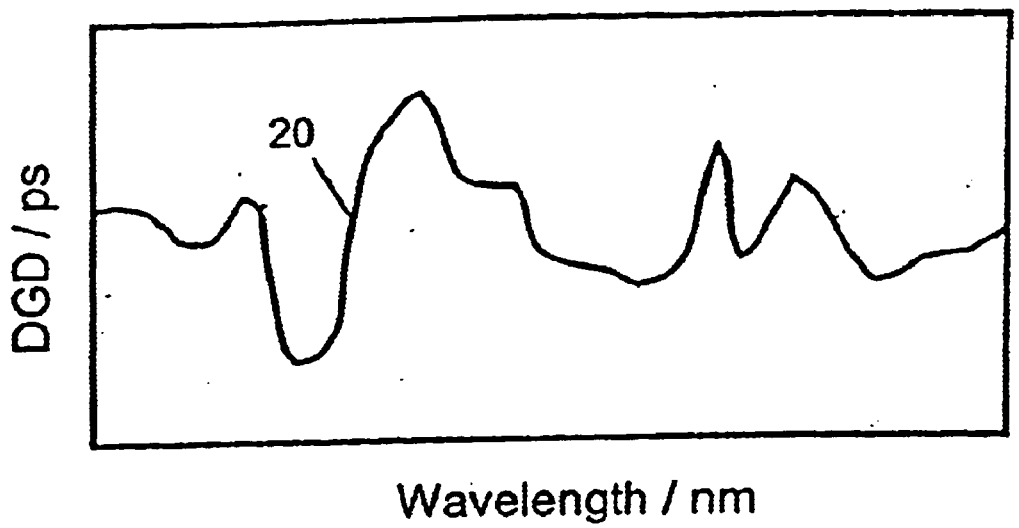
FIG. 2A illustrations an optical fiber with a non-uniform differential group delay with respect to wavelength.
Figure 2B:
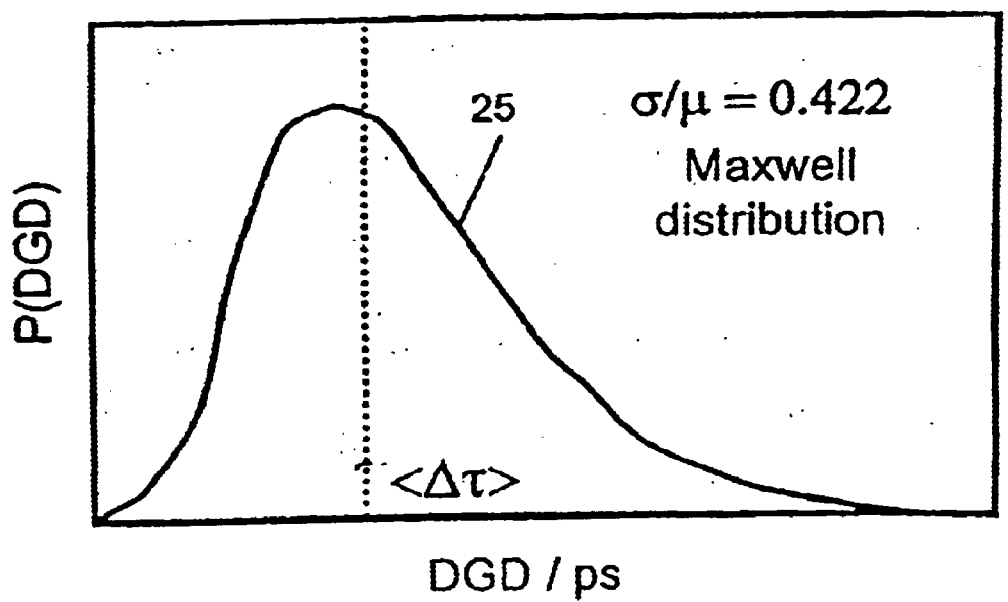
FIG. 2B illustrates a probability distribution of differential group delays exhibiting a Maxwell distribution.

However, fibers do not have a perfectly uniform birefringence, and fibers with randomly varying birefringence exhibit a wavelength dependence to the DGD as shown in FIG. 2A. Specifically, the DGD 20 varies with the wavelength and exhibits a probability density function based on a Maxwellian distribution curve 25 as shown FIG. 2B. The Maxwelliam distribution 25 has a variance-to-mean ratio of 0.422, a fact that can be used to test the completeness of a data set taken with different fiber configurations or states. This is a useful ratio to quickly assess how close a Maxwellian distribution fits a set of data. The PMD is the average of this distribution, which can be very different from a single DGD measured at a specific wavelength. The testing instrument must sample the Maxwellian distribution at a sufficient number of different wavelengths to provide a representative average.

The main drawback associated with the JME technique is the limited bandwidth over which the instrument can obtain the DGD values. It has been shown that there is a correlation between the uncertainly in the PMD measurement, the bandwidth over which the measurement is made, and the absolute DGD of the device under test. The fractional uncertainty, U, is approximately:

$$U=1/(\Delta\omega\Delta\tau)^{1/2}$$

where $\Delta\omega$ is the measurement bandwidth and $\Delta\tau$ is the true PMD value. The combination of small bandwidth and small PMD values give rise to a large uncertainty in the measurement results. Typical experimental results using commercial ECL lasers and test equipment requires approximately 25 kilometers of cable to provide results within +/−33% of the actual value. However, this length of fiber is difficult to handle in a LMC configuration.

Another way to describe the same effect is that for a given fiber length and instrument bandwidth, the rate of DGD variation with wavelength decreases with a decrease in PMD. Hence, the expected Maxwellian distribution in DGD will not be obtained for a low PMD fiber because not enough wavelengths will be sampled. The result of this is unpredictability in the measured PMD. Each time the fiber is measured after rearrangement of internal stresses, a different PMD will result since the entire response is not sampled by a given measurement.

Figure 3B:
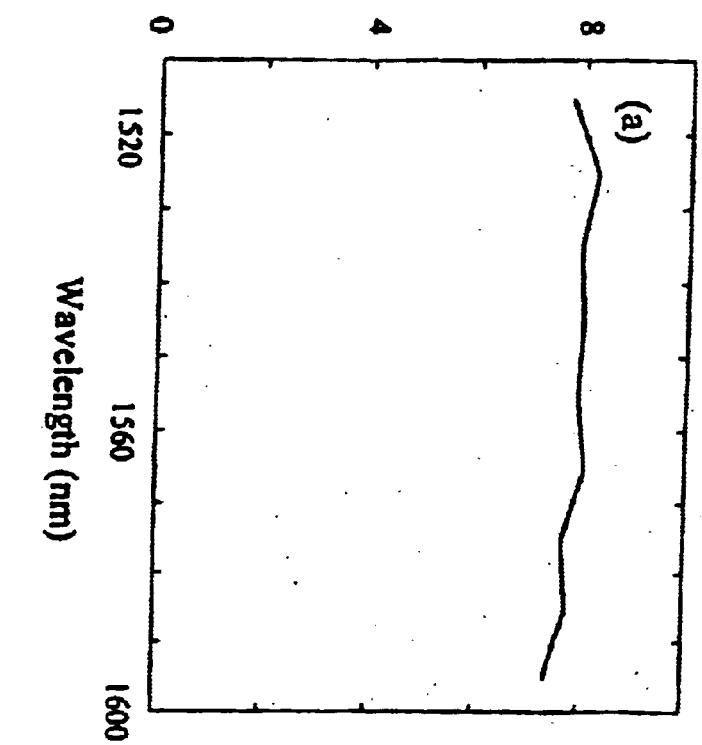
FIG. 3B illustrations the probability distribution measurements in relation to a Maxwellian based curve.
Figure 3A:
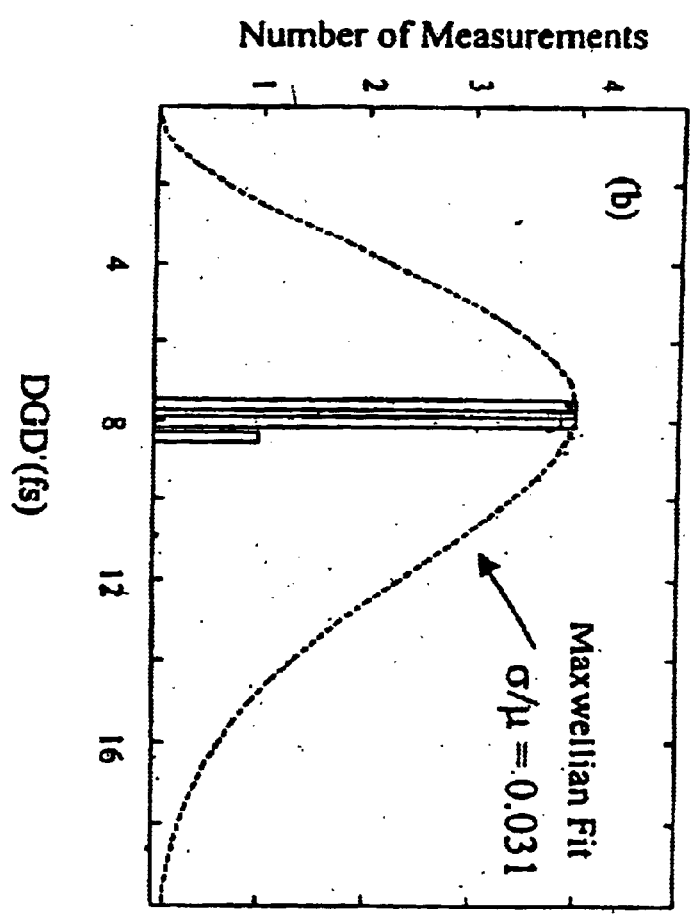
FIG. 3A illustrates actual differential group delay measurements for an optical fiber.

This is illustrated in FIG. 3A in which an approximately one kilometer of fiber was spread in a 55 meter circumference racetrack configuration on a floor. As illustrated, there is little variation of DGD 30 at various wavelengths measured using a 90 nm ECL laser. From this measurement alone, FIG. 3A illustrates a DGD largely within a narrow range. The corresponding distribution of DGD measurements is illustrated in FIG. 3B along with a Maxwellian distribution 35. Typically, these results are due to the effect of small bandwidth of the measuring instruments. For small DGD values (less than 50 fs), the variation of DGD with wavelength is so small that little change will be seen over the bandwidth of a typical JME setup (e.g., 100 nm).

Given the instrument bandwidth limitation, as well as a fiber length limitation for practical handling, the LMC measurement must be enhanced by other measurements incorporating some other variation in fiber stress to produce an accurate set of PMD measurements. The obvious choices are to vary the temperature of the fiber for a series of measurements or manually disturb the fiber stress pattern. Varying the temperature presents operational difficulties, since a large, temperature controlled environment must exist in which the fiber can be placed and allowed to acclimate to the ambient temperature. This choice presents logistical difficulties.

Manually disturbing the fiber is another method for varying the fiber stress. This approach involves spreading the fiber loosely on a large floor (typically, a 55 meter and 450 meter racetrack configurations can be used) and the fiber is allowed to relax overnight. This time period for relaxing generally allows the stress from spooling to disappear (which usually takes at least several hours). After a DGD measurement, the fiber is physically disturbed by patting, rolling, shaking, plucking or tensioning it (or any other suitable means for imposing a mechanical force on the fiber). The purpose of this action is to reorient the internal fiber stresses by an external force. Any of these methods can be used although some may be easier to apply than others. The fiber is then allowed to relax to a new equilibrium stress state (which usually takes a shorter time than the initial despooling) and another measurement is taken.

Figure 4:
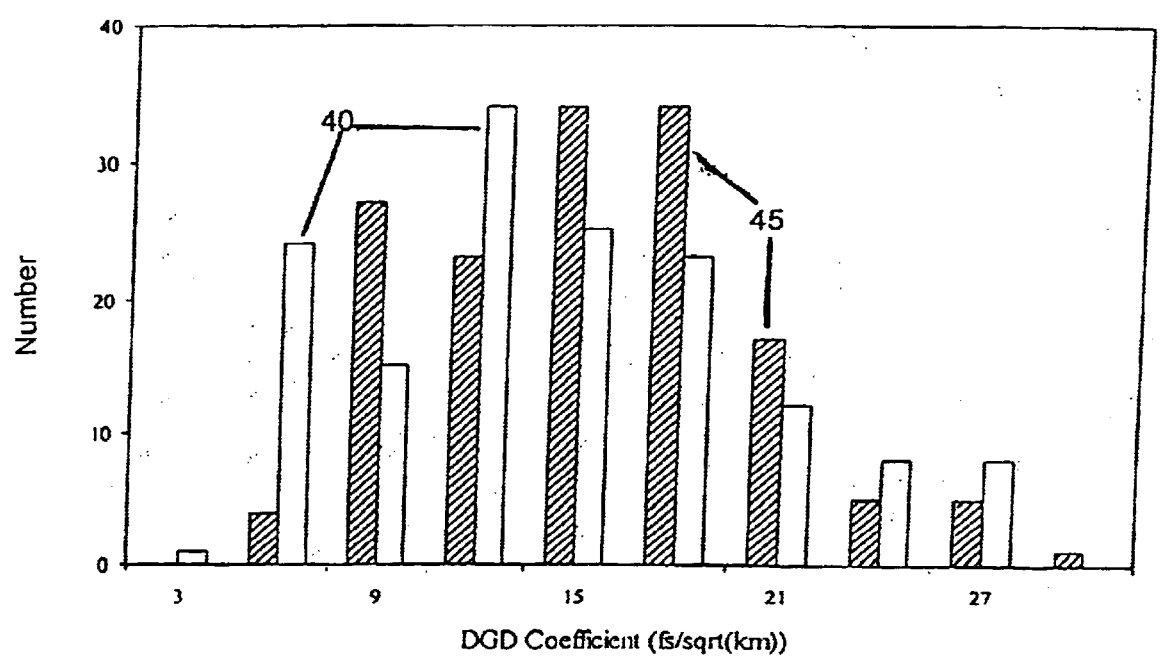
FIG. 4 illustrates a histogram of two fibers measured in a low mode couple state.

Typical results from measuring the PMD taken in this manner are shown in FIG. 4. FIG. 4 shows the histogram of DGD data from a fiber measured on a 55 meter racetrack layout 40 compared with the histograms of the DGD measurements 45 from the same fiber measured on a 450 meter racetrack. As can be seen, the results of measuring the same fiber on the floor in different sized racetrack configurations using different manual disturbance techniques illustrate similar results. The statistical mean of the distributions are within one femtosecond/km/$^{1/2}$ of each other and the variances are within 15% of each other. Since only ten measurements were taken, only a, coarse outline of the distribution is obtained.

However, the above method of obtaining LMC measurements represents several difficulties. First, a large facility is required to handle the large racetrack configuration of loose fiber. Physically rearranging the fiber is physically demanding and time consuming. Handling of the fiber requires care to avoid damage, such as bending which can introduce permanent cracks. Often, the measurements take several days to complete, frequently weeks. Such procedures are not well suited to a production environment. Attempts have been made to overcome these shortcomings by using collapsible spools or other methods which alter the fiber globally, but these methods do not produce a Maxwellian distribution of DGD measurements.

These shortcomings can be overcome by introducing Localized External Perturbations (LEP) on the optical fiber in conjunction with the measurements. In this case, a series of specific points of physical perturbations are applied to the cable so that overall introduction of birefingence is low, but sufficient mode coupling is introduced to alter the DGD measurements. Introduction of the LEP can occur using non-contact and contact methods. Non-contact methods for introducing localized birefringence include subjecting portions of the fiber to external magnetic or electric fields. A typical configuration would be subjecting a portion of the fiber to an induced generated electrical or magnetic field. Alternatively, an optical laser can be used to introduce local birefringence on a section(s) of fiber for producing similar results. However, the contact method of LEP provides a relatively simple, quick, and inexpensive method of introducing various points of mode coupling along the length of the fiber to be tested.

A method of introducing LEP using a contact method is illustrated in FIGS. 5A and 5B. Both of these figures illustrate a collapsible spool used to wind the optical fiber. FIG. 5A depicts the end view of the spool and FIG. 5B depicts a side view of the same spool. The spool 50 contains two slats 52 which are arranged along the axis of the spool 54. The slats move along the radii and perpendicular to the axis, with increasing or decreasing distance from the axis 54. Both slats move simultaneously, and serve to reduce the internal tension present on the fiber 55 introduced when the fiber is wound on the spool. At this point, two weights 56 connected with a flexible rope, wire, or any other suitable flexible material 57, are draped over the spool. At the points of contact 58, the wire 57 introduces a perturbation upon the fiber. The perturbations are introduced at approximately one-revolution intervals along the length of an affected section of the fiber. If the fiber were unspooled and laid out in a linear fashion, the pattern of introduced localized perturbations would correspond to the points of contact with the rope 57.

At this point, the DGD of the fiber can be measured using a test device 59 while the fiber is on the spool using the JME or other technique. The weights 56 are then relocated to another position on the spool. A short amount of time is required (typically a few minutes) for the fiber to adjust and stabilize to the change in physical condition. With the weights relocated, a different set of localized external perturbations is introduced onto the fiber. Again, the DGD measurements using test device 59 can be taken providing another measurement sample. The measurements can be repeated, typically for a total of 10 times, to obtain sufficient samples to provide an estimate of the Maxwellian distribution.

Figure 6:
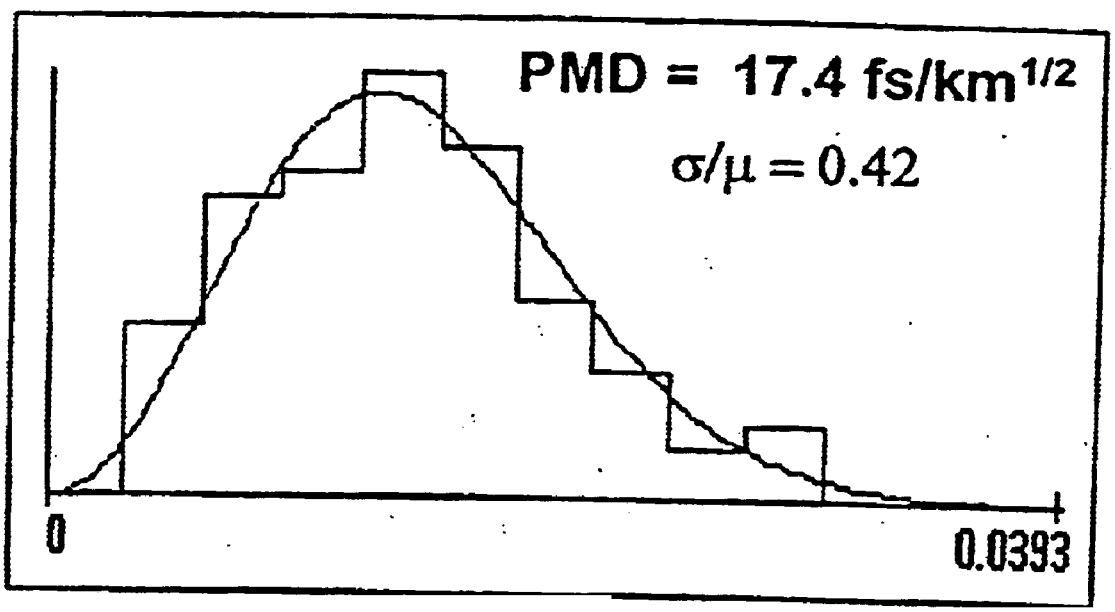
FIG. 6 illustrates test results from measurements of a fiber in one embodiment according to the principles of the present invention.
Figure 7:
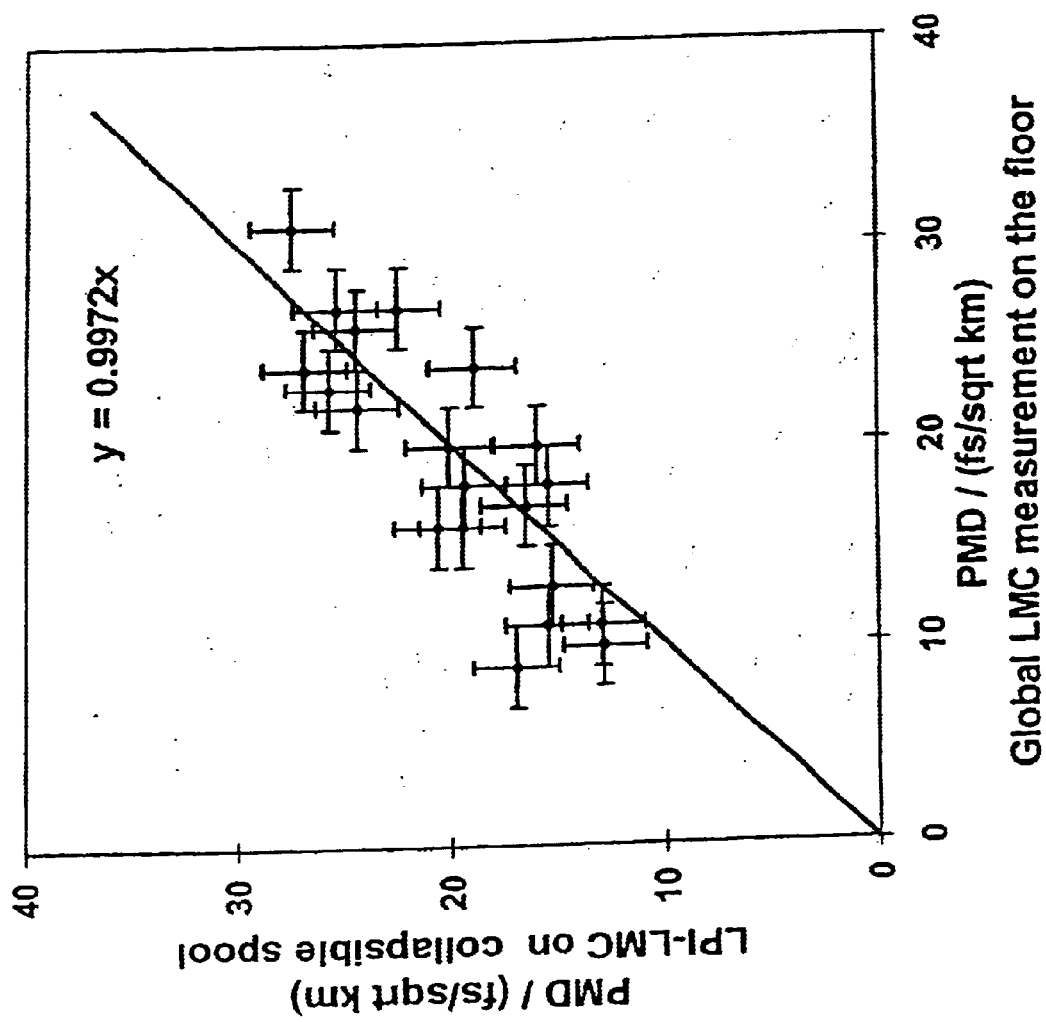
FIG. 7 illustrates the correlation of measurements of a fiber using two methods of measuring the PMD.

Typical measurement samples using the above technique are illustrated in FIG. 6. The average of the DGD values produces a PMD of 17.4 fs/km with $\sigma/\mu$=0.42 that correlates very well with the anticipated distribution of 0.422. Comparing the result of measuring the PMD using this technique with the method of laying the fiber on the floor one can observe a significant correlation. As shown in FIG. 7, data for a fiber that is measured using the above technique is illustrated along with data for the same fiber measured by laying the fiber on the floor in a LMC state.

Figure 8:
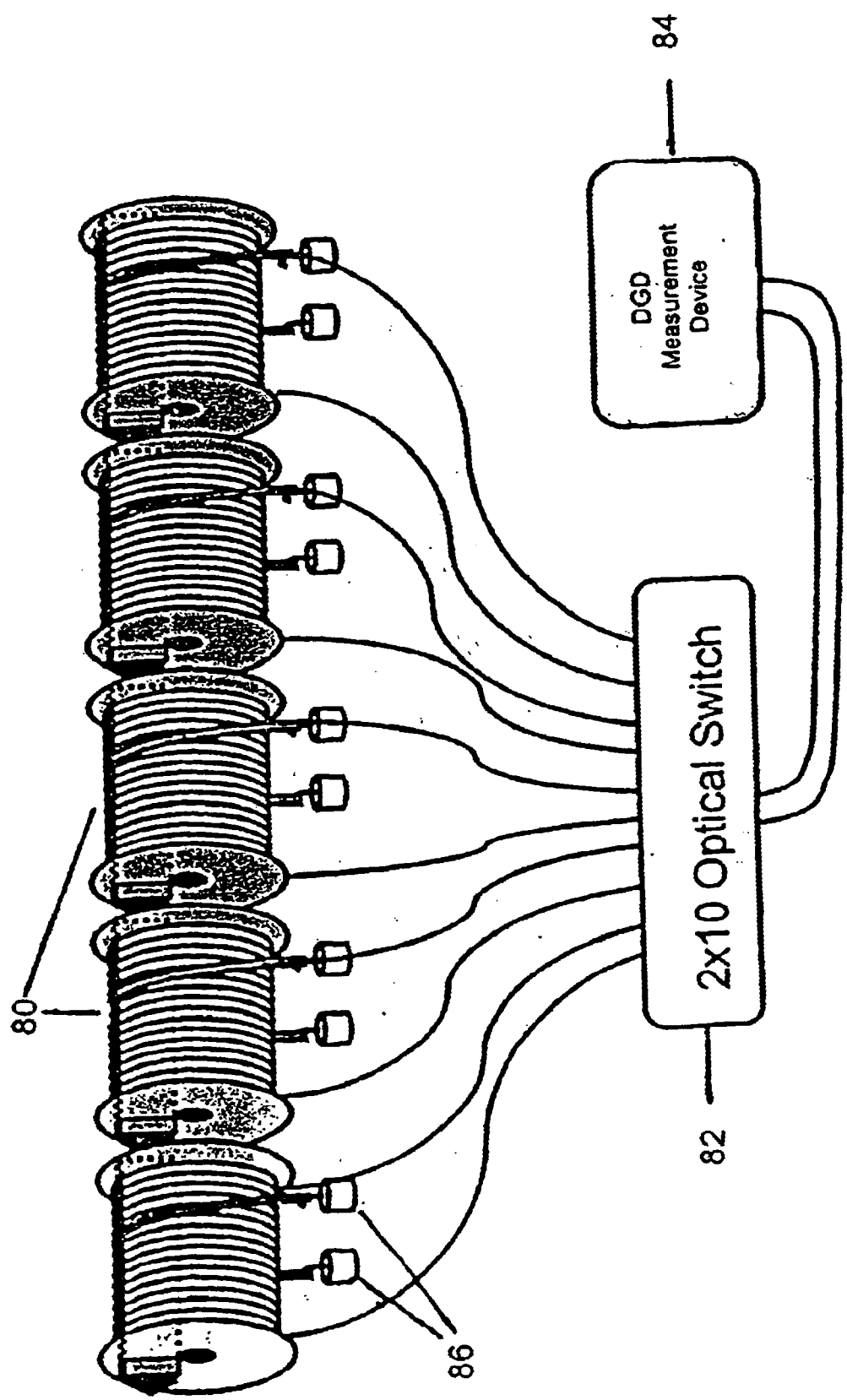
FIG. 8 illustrates a one embodiment of a system for measuring multiple fibers according to the principles of the present invention.

The measurement technique can be expanded to illustrate a large scale PMD measuring system as shown in FIG. 8. Here a plurality of collapsible fiber spools 80 contains optical fibers that are connected to an optical switch 82. A JME measurement system 84 is connected to the switch and can measure a DGD value for any spool to which it is coupled. After the measurement, the weights 86 imparting the LEP to that spool can be repositioned, and the measurement system can be coupled to another spool for another set of measurements. In this manner, a series of spooled fibers can be measured and the LEP can be altered with sufficient time to allow the fiber to relax prior to the next measurement. The speed in which fiber can be tested is greatly increased and avoids despooling the fiber on a large racetrack configuration. This method not only vastly increases the speed of PMD measurement, but also avoids repeated handling and spooling of the fiber, minimizing the opportunity for damage.

Of course, other variations could be employed to illustrate the principles of the present invention. As is evident, the introduction of LEP can be introduced in many other ways. The invention is illustrated using physical weights, but can occur using non-contact methods using lasers, electric fields, magnetic fields, localized heating or contact methods of imparting localized bending, twist, normal stress, tension by force via mechanical devices in a variety of arrangements. Rotating multiple spice joints can act as localized point of perturbation to discontinuously change the state of polarization (SOP). Therefore, it is to be understood that the invention is not limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of measuring polarization mode dispersion in an optical fiber comprising the steps of:
 a) introducing a plurality of localized external perturbations on said optical wherein said optical fiber has a tension of less than 30 grams;
 b) measuring a first differential group delay of said optical fiber;
 c) altering said plurality of localized external perturbations on said optical fiber;
 d) measuring a second differential group delay of said optical fiber; and
 e) repeating steps c) and d) to produce a plurality of differential group delay measurements to produce a value of the polarization mode dispersion.

2. The method of claim 1 wherein said introduction of localized external perturbations is produced on said optical fiber by one or more of a magnetic field, electric field, laser light, or localized heating.

3. The method of claim 1 wherein the optical fiber is wound on a spool comprising tension-releasing slats.

4. The method of claim 1 wherein said introduction of localized external perturbations are produced on the optical fiber by introducing a plurality of localized physical forces on said fiber.

5. The method of claim 4 wherein said introduction of a plurality of localized physical forces on said fiber is accomplished using a flexible member draped over a spool on which said optical fiber is wound.

6. The method of claim 1 wherein at least one minute occurs between said first measurement of said differential group delay and said second measurement of said differential group delay.

7. The method of claim 1 wherein at least five measurements of differential group delay are obtained.

8. The method of claim 4 wherein at least five different configurations of localized external perturbations are introduced on said optical fiber.

9. A method of determining the polarization mode dispersion in a plurality of optical fibers comprising the steps of:
 a) introducing a plurality of localized external perturbations on a first optical fiber wherein said first optical fiber has a tension of less than 30 grams;
 b) switching said first singular optical fiber to a differential group delay measurement device;
 c) measuring a first differential group delay of the first optical fiber;
 d) introducing a plurality of localized external perturbations on a second optical fiber wherein said second optical fiber has a tension of less than 30 grams;
 e) switching the second optical fiber to a differential group delay measurement device;

f) measuring a second differential group delay of the second optical fiber; and g) repeating steps a) through f) to produce a plurality of differential group delay measurements to determine the polarization mode dispersion for the first optical fiber and the second optical fiber.

10. A system for measuring the polarization mode dispersion of an optical fiber, comprising:

a device for introducing localized external perturbations on the optical fiber wherein said optical fiber has a tension of less than 30 grams;

a measurement device for measuring the differential group delay; and a processor for receiving the differential group delay measurement.

11. The system for measuring polarization mode dispersion of claim 10 wherein said device for introducing localized external perturbations comprises a collapsible spool around which the optical fiber is wound.

12. The system for measuring polarization mode dispersion of claim 11 wherein the said device for introducing localized external perturbations further comprises a device introducing a local external perturbation by a physical force on the optical fiber.

13. The system for measuring polarization mode dispersion of claim 12 wherein the said device for introducing localized external perturbations further comprises a flexible member in contact with the fiber on the collapsible spool.

14. The system for measuring polarization mode dispersion of claim 11 wherein said device for introducing localized external perturbations on the optical fiber is one from the group of a device generating an electric field, a device generating an electric field, or a device generating a laser light.

15. A system for measuring the polarization mode dispersion of an optical fiber, comprising:

a device for introducing localized external perturbations on the optical fiber wherein said optical fiber has a tension of less than 30 grams;

a switch for connecting the optical fiber to a measurement device;

a measurement device for measuring a differential group delay of the optical fiber; and a processor for receiving the differential group delay measurement from the measurement device.

16. The system for measuring the polarization mode dispersion of an optical fiber of claim 15 where the switch for connecting the optical fiber comprise an optical switch.

17. The system for measuring the polarization mode dispersion of an optical fiber of claim 15 where said device for introducing localized external perturbations on the optical fiber comprises a spool upon which the optical fiber is wound.

18. The system for measuring the polarization mode dispersion of an optical fiber of claim 17 where said device for introducing localized external perturbations on the optical fiber further comprises a flexible member in contact with the optical fiber on the spool.

* * * * *

UNITED STATES PATENT AND TRADEMARK OFFICE
CERTIFICATE OF CORRECTION

PATENT NO.    : 6,704,100 B2
DATED         : March 9, 2004
INVENTOR(S)   : Sengupta et al.

It is certified that error appears in the above-identified patent and that said Letters Patent is hereby corrected as shown below:

<u>Column 8,</u>
Line 19, after "optical", insert -- fiber --.

Signed and Sealed this

Twenty-seventh Day of July, 2004

JON W. DUDAS
*Acting Director of the United States Patent and Trademark Office*